Nov. 4, 1941.   B. A. PROCTOR   2,261,284
SOUND RECORD AND CORRECTION MARKER THEREFOR
Filed Jan. 23, 1940   3 Sheets-Sheet 1
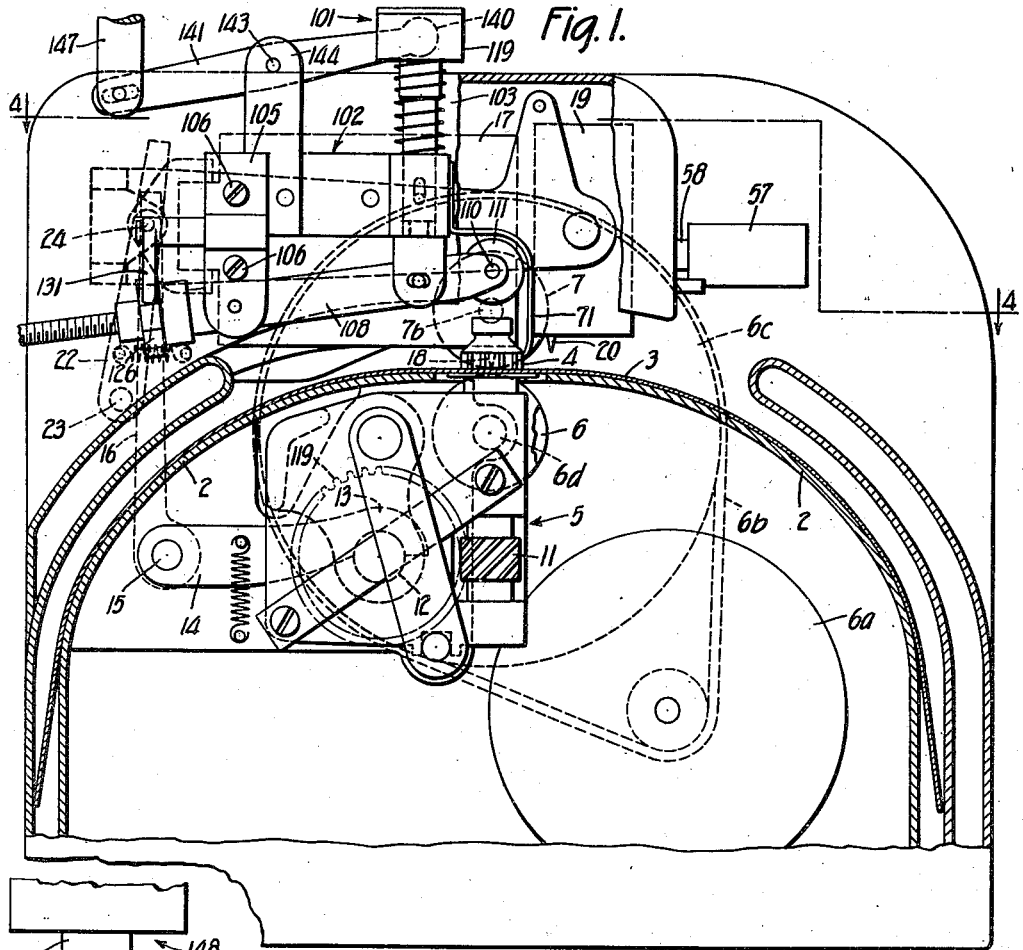
INVENTOR
Barton A. Proctor
BY Moses & Nolte
ATTORNEYS

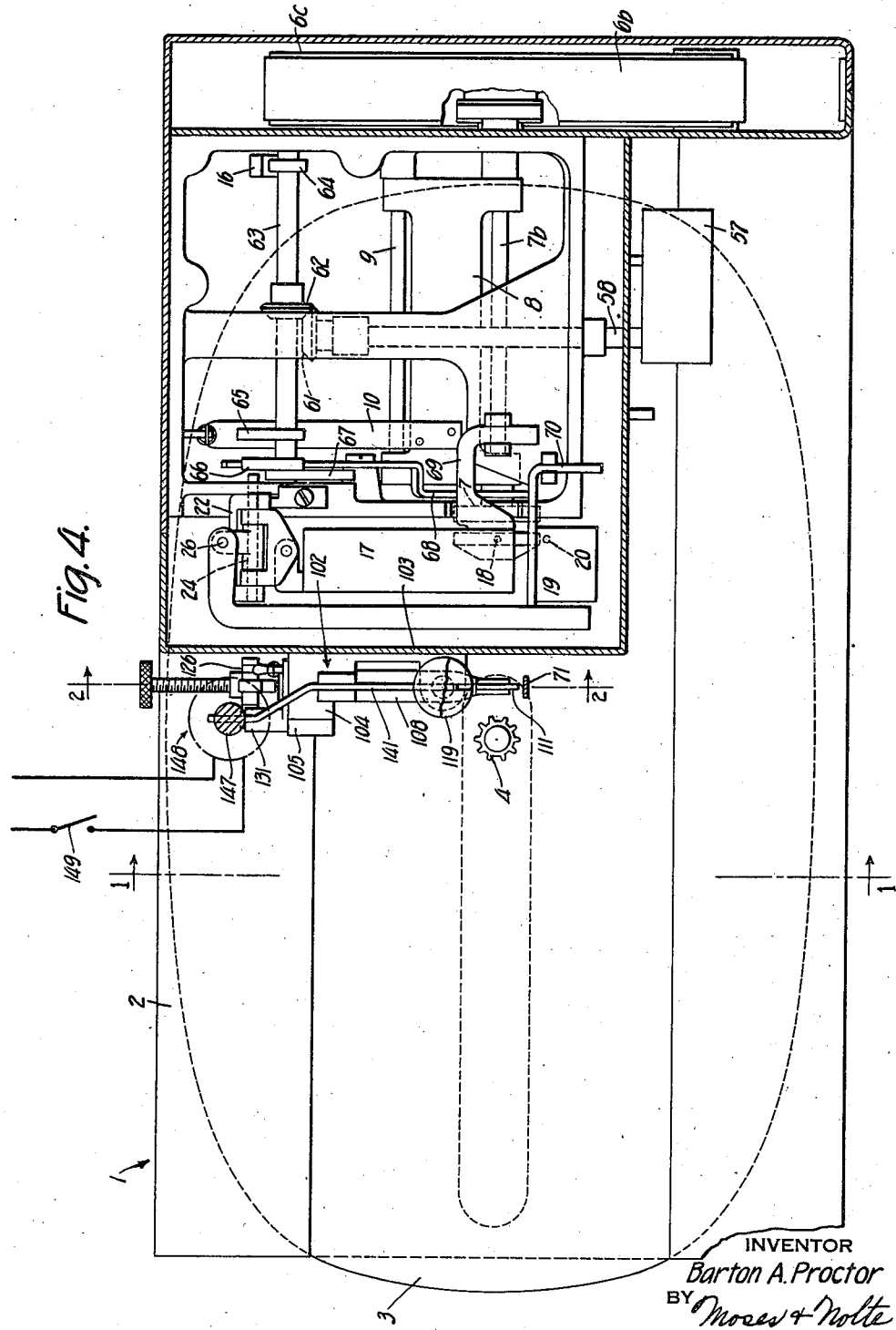

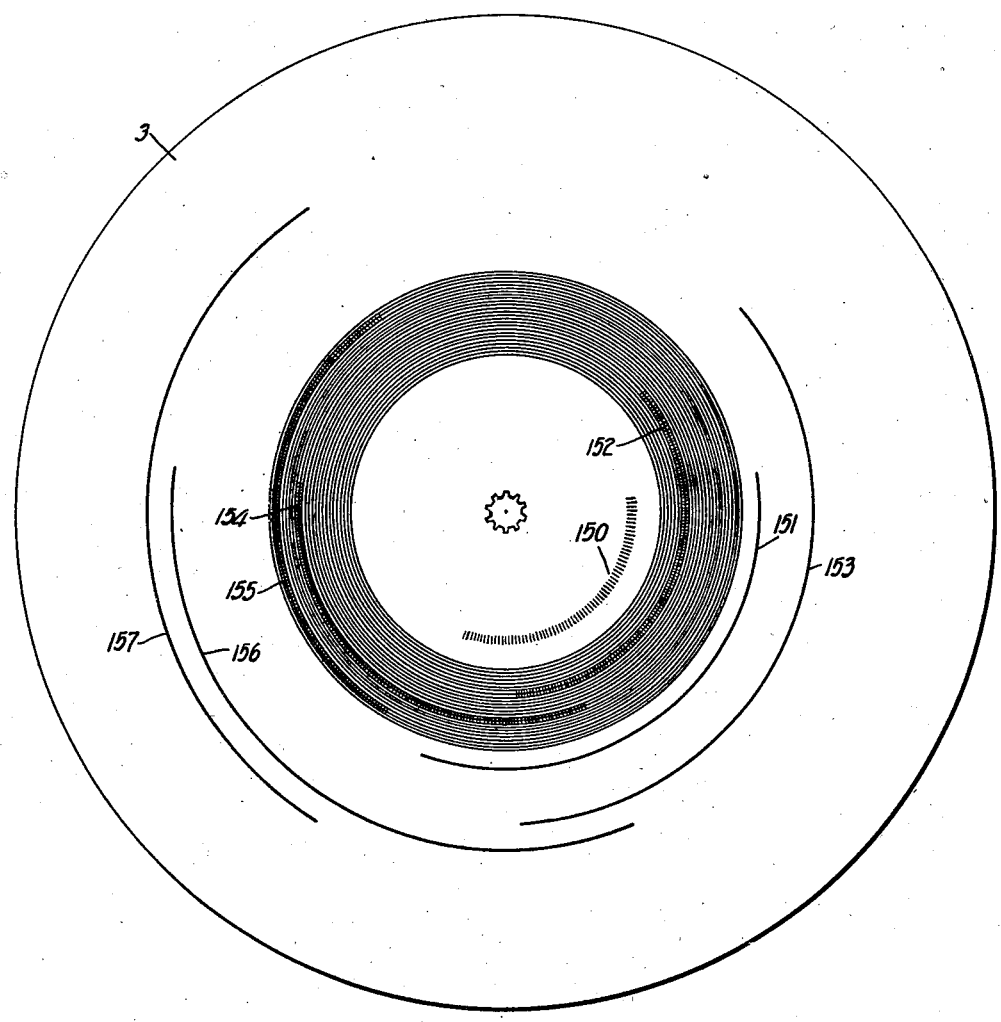

Patented Nov. 4, 1941

2,261,284

UNITED STATES PATENT OFFICE 2,261,284

SOUND RECORD AND CORRECTION MARKER THEREFOR

Barton A. Proctor, Larchmont, N. Y., assignor to B. A. Proctor Company, Inc., New York, N. Y., a corporation of New York Application January 23, 1940, Serial No. 315,169

4 Claims. (Cl. 274—9)

This invention relates to sound translating machines, and more particularly to machines used for the dictation and transcription of letters, memoranda and the like.

While dictation to a machine has very definite and obvious advantages over dictation to a stenographer, it is also subject to very serious disadvantages and drawbacks. One of the chief of these disadvantages lies in the difficulties which arise when the dictator wishes to make a correction. With stenographic dictation the notes made are immediately corrected at will, any portion deleted being crossed out and no longer present to trouble the stenographer when the notes are subsequently transcribed. With machine dictation, however, it is not feasible actually to delete unwanted matter, the result being that after the transcriber hears and writes down some portion of the record it develops that the record goes on to say "strike out all the matter beginning with so and so down to the present point and substitute" etc. This means, perhaps, that a page or a good portion of a page of typing is wasted because the error has been carried too far to admit of correction by erasure. The transcriber having rewritten the page down to the point of deletion is apt to run into the same situation again before the page is finished.

The best method heretofore devised for avoiding such extreme inefficiency as that indicated above has been to require the dictator to make a pencil memorandum by line number of the points in the record where changes are to be found, so that the operator by consulting the memorandum in advance of transcription may be put on guard and may take such precautionary measures as will tend to avoid the transcription of an unwanted part of the dictation.

This method of noting errors is subject to several drawbacks. The most serious of these is that it necessitates interruption of the dictator's train of thought by requiring him to give attention to such mechanical details as laying down his work, finding a pencil, and writing the memorandum which requires attention of his eyes as well as his hand. Then, too, he must look at the line indicator, read it and note down the line reading. This at best is an estimate of the approximate position on the record of the matter to be deleted. The recorded result is subject to the usual possibility of human error, but to an exceptional degree because the dictator is apt to be thinking more about the subject matter of his dictation than the mechanics of recording a correction.

It is an object of the present invention to provide a dictation machine equipped with means for mechanically recording the notation of an error, and this with such simplicity and precision that there is no possibility of an erroneous notation.

To this end it is a feature of the invention that the machine is equipped with a marking device for making a visible mark upon the record in a location bearing a definite and mechanically determined relation to that portion of the record in which the error occurs, the registration of the mark being effected by the simple expedient of pressing a button and holding it down or some equally simple manipulation, while the directions for amendment are being dictated.

The transcriber, upon receiving a record for transcription which contains one or more correction notation marks, first causes the machine to reproduce the portions containing the error or errors and the directions for amendment so as to be apprised in advance of the material which is not wanted.

The transcriber is now able, when the deleted matter is reached in regular order, to avoid the typing of it and to pick up the thread of the dictation without substantial likelihood of error.

The novelty of the present invention relates both to the machine for facilitating the mechanical notation of errors and to the record which includes such mechanically made, visible notations.

Other objects and advantages will hereinafter appear.

In the drawings forming part of this specification and illustrating a practical and advantageous embodiment of the invention:

Fig. 1 is a view in sectional side elevation of a machine embodying features of the invention, the section being taken upon the line 1—1 of Figure 4 looking in the direction of the arrows;

Fig. 2 is a view in sectional elevation of a marking device for marking the notations of error, the section being taken on the line 2—2 of Fig. 4 looking in the direction of the arrows;

Fig. 3 is a fragmentary detail view illustrating particularly the feeding means for the marking material;

Fig. 4 is a horizontal sectional view taken on the line 4—4 of Fig. 1 and looking in the direction of the arrows; and Fig. 5 is a plan view of a record produced by the illustrated machine and having a number of error notation marks recorded upon it.

The invention is illustrated as applied to a machine of the kind disclosed in my pending application Serial No. 281,811, filed June 29, 1939, although its utility is not confined to a machine of that type. Reference may be had to the specification and drawing of application Serial No. 281,811 for a complete disclosure of the illustrative machine, exclusive of the error marking device, and hence the parts which are not new with the present application will be but briefly described herein.

The illustrative machine comprises a frame structure 1 which carries a turtle-back support 2 upon which a thin, flexible disc record 3 may be mounted. The record 3 is impaled upon and interfitted with a center spindle 4, which spindle is mounted on a carriage 5. The record 3 is driven rotatively by a fixed feed wheel 6 and a cooperative feed wheel 7. The feed wheel 7 and its shaft 7b are revolubly supported in a rocker arm or frame 8, Figure 4, the arm 8 being rockably mounted upon a shaft 9 and provided with a tail extension 10 which may be lowered and raised to carry the feed wheel 7 away from and toward the record.

A motor 6a is connected through a belt 6b to drive a pulley 6c, fast on the drive shaft 6d of the feed wheel 6.

Rotation of the record 3 is transmitted to the center spindle 4 and thence through spiral gears 11 and 11a to a feed screw 12 which is mounted in the carriage 5 and serves as the driving element for the carriage. The feed screw is engageable with a half nut 13. The half nut 13 is carried at the forward end of an arm 14 fast on a shaft 15. The shaft 15 also has fast upon it an upwardly extending arm 16 which may be actuated to cause the half nut 13 to be rocked out of engagement with the feed screw 12 and into engagement with the feed screw 12. The nut arm 14 is immovable axially of the feed screw 12, and hence when the half nut 13 is engaged with the feed screw, rotation of the feed screw causes the feed screw and its carriage to move in the direction of the axis of the feed screw and to carry the center spindle 4 away from the point at which the feed wheels engage the record. As a result of the compound motion imparted to the record, a stationary recording stylus 18 is caused to form a spiral sound track in the face of the record 3 which progresses outward from the center as the sound track is scribed on the record by the stylus.

The disclosed machine comprises a recording unit 17 which carries the recording stylus 18 and a separate reproducing unit 19 which includes a reproducing stylus 20.

The units 17 and 19 are mounted for rocking movement about a common horizontal axis 24 which is carried at the upper end of a yoke 22, the yoke 22 being rockably mounted upon a horizontal shaft 23.

Suitable selector or control mechanism is provided for locating the recording stylus 18 in record-engaging position for recording, for substituting the reproducing stylus in the identical position for reproducing, and for locating both styluses out of engagement with the record and concurrently arresting the record drive. These operations are performed by mechanism under the control of an operating finger piece 57 which is fast upon the forward end of a shaft 58. The finger piece may be operated to any one of three positions designated, respectively, as "Record," "Neutral" and "Reproduce." The shaft 58 has fixed to it a beveled pinion 61 which, through a meshing beveled pinion 62 fast on a camshaft 63, serves to operate the camshaft.

The cam shaft has fast upon it four cams 64, 65, 66 and 67. Upon movement of the control handle 57 from the "record" position in Fig. 4 to the "neutral" position, in which position the handle extends vertically upward from the shaft 58, the cam 65 comes into play and by engagement with the tail member 10 of the frame 8 serves to carry the feed roller 7 out of engagement with the record 3, so that the driving of the record is immediately interrupted. The cam 66 next engages the tail portion of a lifter lever 68 and causes a forwardly extending portion of the lever at the opposite side of the fulcrum to be raised, said forward portion engaging arm 69 to lift the recorder 17.

When the forward end of the lifter lever 68 has attained its uppermost position, the parts are in "neutral" position and the record is stopped. The cam 64 has, in the meantime, been carried into engagement with the arm 16 to rock the shaft 15 and the nut arm 14 in a counter-clockwise direction, as viewed in Figure 1.

Thus in the "neutral" position the feed wheel 7 has left engagement with the record, both the recording and reproducing units are held up away from the record, the reproducing unit 19 through an arm 70, and the feed nut 13 has been carried out of engagement with the feed screw 12. The parts may next be shifted to the position for reproducing by operating the control or selector member 57 to the "reproduce" position to the left of the shaft 58 in Fig. 4. The cam 67, which has not up to now performed any function, comes into engagement with the pivot pin 24.

The cam 67 pushes the pivot pin 24 to the rear swinging the yoke 22 about the pivot pin 23, and causing the recording unit 17 and the reproducing unit 19 to be carried rearward. As a consequence of this movement, the stylus 20 is located over the record in the same vertical line previously occupied by the stylus 18. After this rearward movement the lifter lever 68 moves downward permitting the stylus 20 to be lowered into engagement with the record in precisely the position previously occupied by the stylus 18. The completion of the operation of the member 57 to the "reproduce" position serves further to restore the feed nut 13 and the feed wheel 7 to active positions. Thus with the reproducing stylus 20 in record-engaging position the record is driven rotatively and the center spindle 4 with the record 3 is caused to move bodily in the manner already described. The detailed description up to this point is of the machine disclosed in application Serial No. 281,811.

When the dictator is using the machine and realizes that an error has been made, he will dictate directions for the correction of the error, but at the same time he will operate a record marking device 101 for causing a visible mark to be drawn on the record simultaneously with the dictation of the directions for correction. The marking device does not mark the portion of the record at which the directions for correction actually occur, but it is located at a fixed distance from the point at which the stylus engages the record, and hence makes a mark in a mechanically determined relation to the point at which the directions for correction are found. When the transcriber is reproducing the record piecemeal for the purpose of becoming familiar with the corrections, it is only necessary to locate a correction mark under the marker, whereupon the machine may be set to reproduce, and the directions for correction will immediately be heard. To facilitate locating of the mark under the marker there may be provided a fixed pointer 71.

The correction marker comprises a block 102 which is affixed to a frame member 103 by any suitable means. The block 102 includes a rear lateral extension 104 to which a bearing plate 105 is affixed by screws 106 or other suitable means. The lower end of the bearing plate 105 cooperates with an ear 107 formed on the block 102 and provides bearing for a tube 108 which contains a pencil 109 of marking material. The marking material may be in the nature of a crayon, but it is preferably somewhat softer and more moldable than the usual crayon material, being desirably of substantially the same composition and consistency as material commonly used for lip stick. The forward end of the tube 108 is provided with a cross pin 110 which extends across the mouth of the tube and which revolubly supports a marking roller 111. When the roller is in engagement with the record 3 it is rotated in a counter-clockwise direction as viewed in Figure 2 by virtue of the fact that the engaged portion of the record which is illustrated in Figure 2 will be traveling toward the right in that figure. The mouth portion of the tube is cut away to provide suitable clearance between the tube and the periphery of the roller 111, as illustrated in Figure 2.

The tube 108 is provided near its forward end with laterally projecting pins 112 which are received in slots 113 formed in the opposite sides of a yoke 114. The yoke 114 is affixed to a plunger 115 which travels in an axial bore 116 of a larger plunger 117. The plunger 117 is reciprocable in a bore 118 formed in the block 102.

The plunger 117 is provided with an operating head 119 which is adapted to be engaged and depressed by a finger or thumb of the operator, the plunger being normally held upward in a position like that illustrated in Figure 1 by a compression coil spring 120. The spring 120 bears at its upper end against the lower surface of the head 119. When the head 119 is pressed downward the plungers 117 and 115 move downward as a unit until the roller 111 engages the record. The plunger 117 may be thrust farther downward until a shouldered portion 121 of the plunger comes into engagement with the upper face of the block 102 and positively prevents further downward movement. After downward movement of the roller 111 has been arrested by engagement with the record and before downward movement of the plunger 117 has been arrested, the plungers 115 and 117 move relative to one another, compressing a light coil spring 122 which is disposed in the upper end of the bore 116 of the plunger 117. The pressure of the roller 111 against the record is limited to the force which can be exerted by a measured compression of the light spring 122. There is no possibility, therefore, of the roller 111 deforming the sound track of the record. The plunger 115 is limited in its outward movement relative to the plunger 117 by means of a cross pin 123 affixed to the plunger 117, which cross pin extends through and plays in longitudinal slots 124 formed in the plunger 115.

Provision is made for automatically feeding the coloring material 109 toward the wheel 111 each time that the plunger 117 is depressed to carry the wheel 111 against the record 3. The rear end of the tube 108 is swung upward each time that the wheel end of the tube is swung downward. The rear end of the tube has threaded upon it a cap 125, upon which a ratchet wheel 126 is journalled. The ratchet wheel 126 is held to the cap 125 by bent arms 127, three of the arms being illustrated in Figure 3. The arms 127 may be affixed to the cap 125 in any suitable manner as by spot welding. The ratchet wheel 126 has an internally threaded portion for engaging a feed screw 128 which carries a feed piston 129 at its forward end. The cap 125 has affixed to it a pin 129a which plays in a longitudinal slot 130 formed in one side of the feed screw 128 to restrain the feed screw normally against rotation. A pawl 131 is pivotally mounted upon a pin 132 carried by the plate 105 and is normally held in position to intercept a tooth of the ratchet 126 as the ratchet moves upward, and thereby to cause the ratchet to be turned clockwise (as seen in Fig. 3), a distance of one tooth space.

The pawl 131 includes a horizontally extending arm 133 which is normally held up against a stop 134 of the block 102 by means of a tension spring 135. The spring is connected at one end to a pin 136 affixed to the block 102 and at the other end to a finger piece 137 carried by the arm 133.

The rotation imparted to the ratchet 126 is effective to advance the non-rotary feed screw 128, and its piston 129 a short distance toward the wheel 111 and thereby to urge the marking material 109 toward the wheel.

When it is desired to replenish the supply of marking material in the tube 108, it is necessary to remove the feed screw 128, the cap 125, and the ratchet wheel 126 from the tube 108, and also to retract the feed screw relative to the cap and ratchet.

The removal of the cap 125 from the tube 108 requires that the arms 127 be turned counter-clockwise past the pawl 133. It is for this reason that the finger piece 137 is provided, so that the operator may conveniently rock the pawl to a position clear of the arms 127.

The feed screw is desirably provided at its rear or outer end with a knurled knob or finger piece 138, whereby the feed screw can be turned. Since the feed screw and the cap 125 are prevented from rotation relative to one another, the turning of the knob 138 is effective to unscrew the cap from the tube 108. When the cap has been thus unscrewed the feed screw, the cap, and the ratchet wheel may be removed as a unit from the tube 108. The feed screw is then retracted relative to the ratchet wheel by holding the ratchet wheel stationary and rotating the knob 138 in a clockwise direction as the parts are viewed in Fig. 3. Since the arms 127 turn with the feed screw, it is necessary to hold the ratchet wheel by its hub during this operation. The hub may be made conveniently long for this purpose.

The supply of marking material having been replenished, the piston 129 is replaced in the tube 108 and the cap is again threaded onto the tube. The ratchet is then rotated until the piston is found to be pressing the marking material firmly against the wheel 111. The latter part of this adjusting rotation can, if desired, be produced through repeated operation of the plunger 117.

It will be observed that the correction marker described is arranged to apply the correction indicating mark directly upon the record itself, and this without more attention on the part of the dictator than the pressing of a button. While the marker has thus far been described as designed for direct manual operation, means are also provided for operating the marker by remote control.

The upper portion of the plunger 117, including a portion of the head 119 which is integral with the plunger, is slotted for the reception of a forward, rounded end 140 of a lever 141. The head 119 includes a cover plate 142 which over-lies the end of the lever and covers the slot, and which is secured to the main body of the head in any suitable manner as by spot welding. The lever 141 is fulcrumed at 143 upon a stationary arm 144 of the block 102. The tail portion of the lever 141 is formed with a slot 145 for receiving a cross pin 146 carried by the armature 147 of an electromagnet 148.

The electromagnet is normally deenergized, but may be energized at will to produce a single upward pull of the armature 147 by the closing of a normally open manual switch 149, Figure 4, which is connected in series with the winding of the electromagnet 148 and with a suitable source of electrical energy. The switch 149 may be provided at the machine or at any distance away from the machine, and may be arranged for operation by either the hand or foot of the dictator. When the electromagnet is energized the plunger 117 is thrust downward, and when the electromagnet is thereafter deenergized, the plunger 117 is carried upward by the spring 120. The operation is in all respects the same as when the plunger is manually actuated from the head 119.

The mark for indicating each correction may extend throughout all or a portion of the sector of the record which contains the direction for correction to which it relates, and is disposed at a fixed radial distance inward from the portion of the record to which it pertains.

When the transcriber wishes to check the corrections the record is placed upon the center spindle 4, with the control member 57 in the neutral position. The carriage is then shifted manually to bring the first correction mark 150 beneath, or nearly beneath, the wheel 111. The recorded matter 151 or a portion preceding it on the record may be thereby disposed in stylus engaging position. The control member 57 is operated to the "reproduce" position and the contents of the reproduced portion, including the portion 151 are mentally noted. The member 57 is then returned to the "neutral" position, and the carriage is again shifted to bring the beginning of the mark 152 beneath or nearly beneath the wheel 111. The recorded matter in the region of the heavy line 153 is then in position to be reproduced and is reproduced by operating the control member 57 to the "reproduction" position. Similarly the marks 154 and 155 are successively utilized in reproducing the portions of the recording in the region of the heavy lines 156 and 157, respectively.

The transcriber is now ready to reproduce the record for transcription, and proceeds to do so by setting the carriage to the zero position, and then setting the control member 57 to the reproducing position.

A specific mode of procedure for utilizing the correction marker has been pointed out. This procedure may, of course, be altered or varied in any way which is found to be practical and satisfactory.

I have described what I believe to be the best embodiments of my invention. I do not wish, however, to be confined to the embodiments shown, but what I desire to cover by Letters Patent is set forth in the appended claims.

I claim:

1. A dictation machine comprising, in combination, means for driving a record, means for recording sound upon the record, and record marking means comprising a tube for holding a supply of marking material, a marking roller mounted across the discharge end of the tube, means supporting the tube for rocking movement about an axis that extends transversely of the tube axis, means for rocking the tube to carry the roller against the record, and means operated as an incident of the rocking of the tube to feed the marking material toward the marking roller.

2. A dictation machine comprising, in combination, means for driving a record, means for recording sound upon the record, and record marking means comprising a tube for holding a supply of marking material, a marking roller mounted across the discharge end of the tube, means supporting the tube for rocking movement about an axis that extends transversely of the tube axis, means for rocking the tube to carry the roller against the record, means operated as an incident of the rocking of the tube to feed the marking material toward the marking roller comprising a piston in the tube, a feed screw joined to the piston, a rotary feed member having threaded engagement with the feed screw, and means cooperative with said rotary member for advancing it step by step at each reciprocation of the tube.

3. A dictation machine comprising, in combination, means for driving a record, means for recording sound upon the record, and record marking means comprising a tube for holding a supply of marking material, a marking roller mounted across the discharge end of the tube, means supporting the tube for rocking movement about an axis that extends transversely of the tube axis, means for rocking the tube to carry the roller against the record, and means operated as an incident of the rocking of the tube to feed the marking material toward the marking roller comprising a piston in the tube, a feed screw joined to the piston, a cap threaded on the tube and including means for restraining the feed screw against rotation, a rotary member carried by the cap and having threaded engagement with the feed screw, and means cooperative with the rotary member for advancing it a step at each reciprocation of the tube.

4. A dictation machine comprising, in combination, means for driving a record, means for recording sound upon the record, and record marking means comprising a tube for holding a supply of marking material, a marking roller mounted across the discharge end of the tube, means supporting the tube for rocking movement about an axis that extends transversely of the tube axis, means for rocking the tube to carry the roller against the record, and means operated as an incident of the rocking of the tube to feed the marking material toward the marking roller comprising a piston in the tube, a feed screw joined to the piston, a cap threaded on the tube and including means for restraining the feed screw against rotation, a rotary member carried by the cap and having threaded engagement with the feed screw, said rotary member being formed with rotary teeth and being shiftable bodily by and with the tube, and a pawl cooperative with said teeth to rotate the rotary member step by step.

BARTON A. PROCTOR.